United States Patent [19]

Kawaguchi et al.

[11] Patent Number: 5,294,275
[45] Date of Patent: Mar. 15, 1994

[54] METHOD OF ATTACHING A BEAD FILLER TO A BEAD CORE

[75] Inventors: Katsuhide Kawaguchi, Numazu; Masahiro Iida, Shinshiro, both of Japan

[73] Assignee: The Yokohama Rubber Co., Ltd., Tokyo, Japan

[21] Appl. No.: 920,450

[22] PCT Filed: Dec. 25, 1991

[86] PCT No.: PCT/JP91/01760
  § 371 Date: Aug. 26, 1992
  § 102(e) Date: Aug. 26, 1992

[87] PCT Pub. No.: WO92/12002
  PCT Pub. Date: Jul. 23, 1992

[30] Foreign Application Priority Data
  Dec. 28, 1990 [JP] Japan .................. 2-408685

[51] Int. Cl.$^5$ .................................. B29D 30/48
[52] U.S. Cl. .................................. 156/136; 156/131
[58] Field of Search .................. 156/130.7, 131, 132, 156/136; 152/541

[56] References Cited
FOREIGN PATENT DOCUMENTS
62-46634 2/1987 Japan.

Primary Examiner—Michael W. Ball
Assistant Examiner—Richard Crispino
Attorney, Agent, or Firm—Nikaido, Marmelstein, Murray & Oram

[57] ABSTRACT

A tire-bead manufacturing method, comprising preparatively providing a bead filler as a member comprising a filler body part and a projection part connected to each other through a portion of connection and having taper surfaces facing each other, and after the projection part of the bead filler is attached onto an outer peripheral surface of a bead core, turning the filler body part to stand up with the portion of connection together of the filler body part and the projection part as the point of turning.

3 Claims, 3 Drawing Sheets

METHOD OF ATTACHING A BEAD FILLER TO A BEAD CORE

FIELD OF ART

The present invention relates to a method of the production of tire-beads, and more particularly, a method of tire-bead production by which a bead filler can be attached to a bead core with improved accuracy.

BACKGROUND ART

The tire-bead is a member used in the bead portion of tire. Generally, it is composed of a wire bead-core comprising a bundle of bead wires formed in a ring shape and a bead filler comprising a member made of, for example, a hard rubber. This annular or ring structure is usually formed by attaching a bead filler which is substantially triangular in section onto the outer peripheral surface of a bead core which is rectangular in section.

According to a known method of production of tire-beads, as shown in FIG. 7 of the accompanying drawings, a bead filler 11 which is substantially triangular in section is disposed cylindrically along a side surface 12a of a ring-shaped rectangular cross-section bead core 12. Then a fluid under pressure is supplied into a bladder 13 in the direction shown by an arrow a to expand the bladder 13 and stand the bead filler 11 up in the direction shown by an arrow. As shown in FIG. 8, a bottom surface 11a of the bead filler 11 is then bonded or otherwise attached onto an outer peripheral surface 12b of the bead core 12 (Japanese Patent Application Kokai Publication No. 53-128682).

According to the above production method, however, when the cylindrical bead filler 11 is placed along the side surface 12a of the bead core 12, and the bladder 13 is expanded to stand the bead filler 11 up in the direction of the arrow b so as to attach the bottom surface 11a of the bead filler 11 onto the outer peripheral surface 12b of the bead core 12, the bottom surface 11a of the bead filler 11 and the outer peripheral surface 12b of the bead core 12 tend not to accurately align with each other but undergo a mutual dislocation. Therefore, this known production method has a difficulty with attaining accuracy of the bonding or attachment together of the bead filler and the bead core.

In order to solve the above problem, the applicant of the present application has previously proposed a member of the type shown in FIG. 9 for the bead filler 11, in which a projection portion 11B of a reduced web thickness is integrally formed ahead of time on the bottom portion 11A of a bead filler 11 (Japanese Patent Application Kokai Publication No. 62-46634). In the production of a tire-bead using this modified bead filler 11, the relatively thin protection portion 11B formed on and projecting from the bottom portion 11A of the bead filler 11 is attached onto the outer peripheral surface 12b of the bead core 12, cylindrically around the bead core 12. Then, the bead filler 11 is cut to the prescribed length corresponding to the circumferential length of the bead core 12. The cut end portion of the bead filler 11 is joined to the first or leading end portion thereof. Thereafter, the bead filler 11 is caused by the bladder 13 to stand up with its portion X as turn-up point. The bottom surface 11a of the bead filler 11 is bonded or otherwise annularly attached onto the upper surface of the relatively thin projection portion 11B.

Accordingly to the above described method, however, the relatively thin projection portion 11B of the bead filler 11 has a constant thickness over its whole region including the turn-up point portion X. A problem occurs in that as this bead filler 11 is turned at the portion X to stand up, it tends to undergo an opening motion to return to its original horizontal position due to the reaction force generated in the turn-up point portion X. This results in that the side surface 11b of the standing-up bead filler 11 cannot take a substantially linear position relative to the side surface 12a of the bead core 12 and a uniform attachment of the bead filler 11 onto the outer peripheral surface 12b of the bead core 12 cannot be effected.

Accordingly, the object of the present invention is to provide a method of the tire-bead production according to which a bead filler can be stood up virtually perpendicularly to a bead core and can be attached to the bead core at a high rate of accuracy of the attachment.

DISCLOSURE OF THE INVENTION

The tire-bead production method for attaining the above object according to the present invention is characterized by providing a bead filler comprising an unvulcanized rubber and including a filler body part having a bottom portion comprising a slant taper surface and a projection part having an upper surface comprising a slant taper surface, which are integrally connected to each other with their taper surfaces arranged to form a V-shape; attaching the projection part of the bead filler onto an outer peripheral surface of a bead core in a ring shape, cylindrically over a whole circumference of the bead core; then turning the filler body part to stand up with a point of connection together of the filler body part and the projection part as the point of turning, and attaching the taper surface of the filler body part on to the taper surface of the projection part; and thereby letting the filler body part stand up substantially perpendicularly to the outer peripheral surface for the bead core.

The method of the invention is characterized also in that in order to let the turned-up edge of the bead filler be flush with a side surface of the bead core, circumferentially along the bead core, a tapered roller is utilized as a guide applied at the point of connection in the bead filler while the projection part of the bead filler is applied to the bead core.

The tire-bead production method according to the present invention is constituted as above, so that a bead filler can be stood up substantially perpendicularly to a bead core and thereby it can be attached to the bead core with high accuracy. As a result of this, it is possible according to the present invention to enhance the accuracy of tire-bead products. Also, the invention can enable an automation of the splicing together of cut end portions of a bead filler. Moreover, relying on such method according to the present invention in which by applying a tapered roller at the point of connection together of the filler body part and the projection part, the turned-up edge of the bead filler is aligned with the side surface of the bead core. Thus it is possible to further enhance the accuracy of attachment of the bead filler onto the bead core.

BEST MODE FOR THE CARRYING OUT OF THE INVENTION

Figure 1:
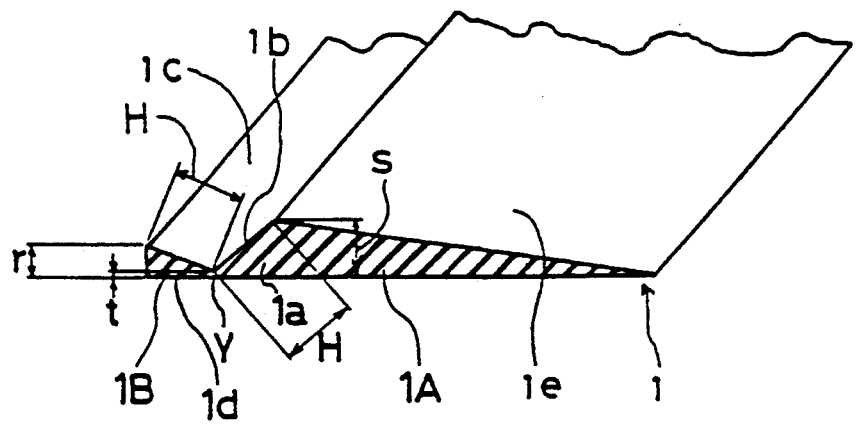
FIG. 1 is a partly broken-away enlarged perspective view, showing a portion of a bead filler for use in the carrying out of the method of the present invention.

As shown in FIG. 1, a bead filler 1 for use according to the present invention is in the form of a belt and comprises a filler body part 1A which is virtually triangular in section and a projection part 1B, comprising an unvulcanized rubber. The projection part 1B is integrally connected through a connection portion Y to a bottom portion 1a of the filler body part 1A, along the longitudinal direction of the bottom portion 1a and on a same plane as the filler body part 1A. The surface of the bottom portion 1a of the filler body part 1A and an upper surface of the projection part 1B comprise slant taper surfaces 1b and 1c respectively, which face each other in a V-shape arrangement at the sides of the connection portion Y. Thus, each of a maximum thickness r of the projection part 1B and a maximum thickness s of the filler body part 1A is greater than a thickness t of the connection portion Y. As a result of this, when the bead filler 1 is turned or folded up along the connection portion Y, a wedge effect is produced in the connection portion Y and a stress concentration occurs in this portion Y. When the filler body part 1A is caused to stand up by a bladder and its taper surface 1b is attached onto the taper surface 1c of the projection part 1B as later to be described in greater detail, a reaction force generated in the connection portion 6 is small so that the bead filler 1 can be arranged in a stable standing-up position.

In order that the filler body part 1A turned or folded up along the connection portion Y can be exactly bonded to the projection part 1B, it is required that the taper surface 1b of the filler body part 1A meeting the taper surface 1c of the projection part 1B be of the same length H.

Figure 2:
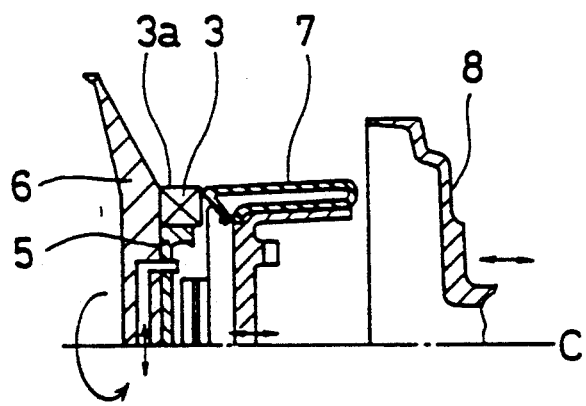
FIGS. 2 to 6 are views taken for illustration of production steps according to the present invention.

FIG. 2 is a schematic sectional view, showing a half portion divided along a central axis C, of essential portions of apparatus for the production of tire beads, in which the numeral 5 denotes a bead clamp ring for clamping a bead core 3, the numeral 6 being a support ring for bonding the bead filler 1 to the bead core 3, 7 being a bladder to be expanded by a pressurized fluid to stand the filler body part 1A of the bead filler 1 up, and 8 being a pressure ring for pressing against the bladder 7 in an expanded condition. Respective members of the apparatus are movable in directions shown by respective arrows.

Now, a description is given of a method of the tire-bead production to be carried out using the above described bead filler 1 and apparatus.

Figure 3:
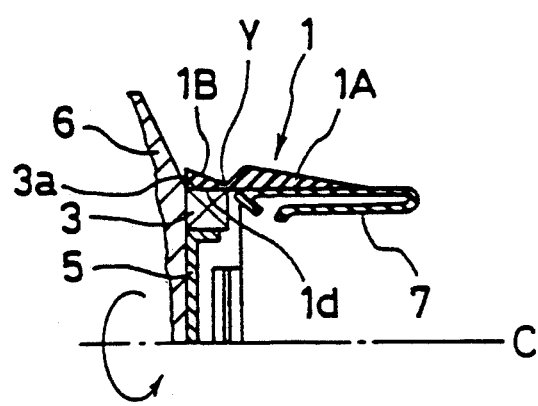

Initially, while the bead core 3 held by the bead clamp ring 5 and the support ring 6 is rotated about the central axis C as shown in FIG. 3, a bottom surface 1d of the above described projection part 1B of the bead filler 1 is cylindrically attached to an outer peripheral surface 3a of the bead core 3.

Figure 4:
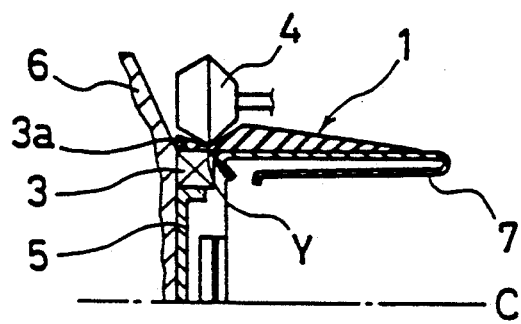
Figure 5:
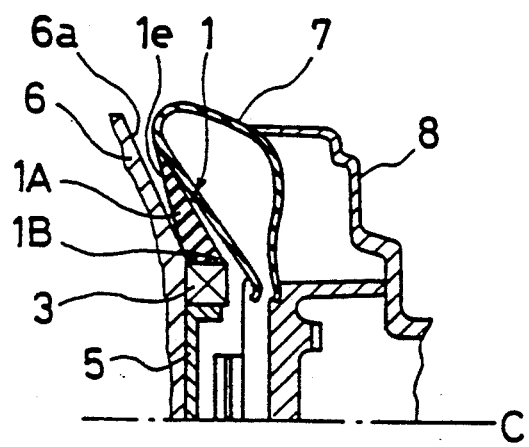

The above production step may be carried out while a tapered roller 4 is applied to and guided along the connection portion Y of the bead filler 1 in bonding the bead filler 1 cylindrically, as shown in FIG. 4. As is apparent, the use of a tapered roller in connection portion Y ensures that the entire bead filler 1 aligns itself relative to the bead core 3 held by the clamp ring and support ring such that when the bead filler may be misaligned as it is being applied, the respective tapered surface of the roller pushes either taper surface 1b or 1c to move the bead filler to be aligned. According to this method, the bead filler 1 can be wound on the bead core 3 in such a manner that the turned-up edge of the bed filler 1 is uniformly along an edge of the outer peripheral surface 3a of the bead core 3.

Then, the wound-up bead filler 1 is cut at a terminal end, and the end face of the cut terminal end and the end face at the leading end are joined together, for example, by a pressure attachment, whereby the step of winding a bead filler 1 on the bead core 3 is completed. Thus, the bead filler 1 is cylindrically wound on the bead core 3, closely attached on the outer peripheral surface 3a of the bead core 3 and becomes completely bonded to the surface 3a.

Thereafter, the bladder 7 is expanded with pressurized fluid introduced into the bladder 7 to turn or fold the filler body part 1A of the bead filler 1 up along the connection portion Y to end up in a standing position. Then the bladder 7 is increasingly compressed by the pusher ring 8, and the standing position of the filler body part 1A is thereby increasingly brought to be close to be virtually perpendicular to the bead core 3. In addition, while a side face 1e of the filler body part 1A is compressed by the support ring 6 provided beside the bead core 3, the taper surface 1b of the filler body part 1A is strongly bonded to the taper surface 1c of the projection part 1B. By attaching the bead filler 1 onto the bead core 3 while the former is kept in a virtually upright standing position as described above, it is possible to bond the bead filler 1 to the bead core with high accuracy.

While it differs depending on the angle of inclination of the taper surface 1b of the filler body part A and that of the taper surface 1c of the projection part 1B, the angle at which the filler body part 1A may be turned or folded up to is preferably within a range of 90° to 120° relative to the horizontal. As a matter of course, the support ring 6 has a support surface 6a inclined at the corresponding angle to the turn- or fold-up angle of the filler body part 1A.

Figure 6:
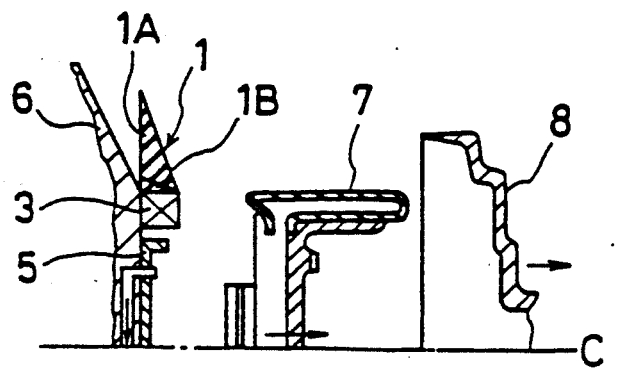
Figure 7:
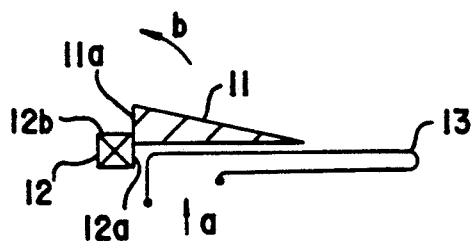
FIGS. 7 to 9 are views taken for illustration of a conventional tire-bead production method.
Figure 8:
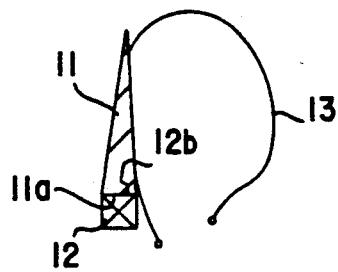
Figure 9:
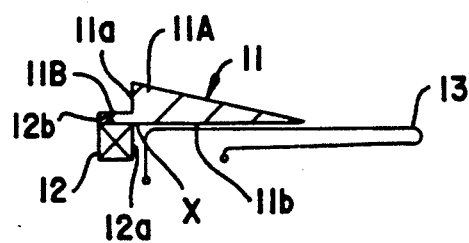

Then, as shown in FIG. 6, after the pressure ring 8 is retracted, the pressurized fluid is withdrawn from the bladder 7 to permit the bladder 7 to contract, and at the same time as this, the bead clamp ring 5 and the bladder 7 are retracted, followed by taking the formed tire bead out of the apparatus to complete the operation steps.

As described above, according to the present invention, a bead filler is preparatively provided in the form of a member comprising mutually connected filler body part and projection part having taper surfaces facing each other, and after the projection part of such bead filler is attached onto the prescribed outer peripheral surface of a bead core, the filler body part is turned or folded up with the connection portion as the point of turning or folding. In this manner it is possible to attach the bead filler onto the bead core in the condition of the bead filler of being in a virtually perpendicularly standing position relative to the bead core, with high accuracy.

Also, according to the method of the present invention, the advantages are brought about not only that it becomes possible to automatically carry out the splicing together of the leading and the trailing ends of the bead filler, but also that the product precision of product tire beads can be enhanced. Moreover, in carrying out the winding of the bead filler on the bead core, a tapered roller may be guided along the connection portion, when it is possible to further improve the accuracy of the attachment of the bead filler onto the bead core.

Possible Industrial Utility

The tire-bead manufacturing method of the present invention attainable the above described remarkable results can be highly effectively utilized in the manufacture of tire beads comprising a bead core and a bead filler.

We claim:

1. A tire bead manufacturing method comprising:
   providing a tire bead filler composed of an unvulcanized rubber and including a triangular body part having a bottom surface comprising a tapered surface of length H and a triangular projection part having an upper surface comprising a tapered surface also of length H, said body part and projection part being integrally connected at an apex of each of the two triangular parts to form a connection point such that their tapered surfaces are arranged to form a V-shape and connected sides adjacent to the tapered surfaces being arranged to form a straight surface;
   supplying an annular tire bead core with an outer, radially peripheral surface and attaching the projection part of the bead filler cylindrically to the annular bead core such that the body part projects in an axially direction relative to the annular bead core and the projection part covers the outer radially peripheral surface of the bead core; and
   then turning the filler body part, with said point of connection as a turning and folding point, to attach the tapered surface of the body part onto the tapered surface of the projection part and thereby bringing the filler body part into a substantially perpendicular arrangement relative to said outer, radially peripheral surface of the bead core.

2. The method according to claim 1 further comprising applying a guiding means as a guide to the point of connection during the attached of the projection part of the bead filler to the annular bead core in order to align the turning and folding point with a side surface of the bead core.

3. The method according to claim 2 further comprising using a tapered roller as the guiding means, and wherein the step of attaching the projection part of the bead filler cylindrically to the annular bead core includes guiding the tapered roller along the point of connection as the bead filler is being applied to the annular bead core.

* * * * *